(12) United States Patent
Steeves et al.

(10) Patent No.: US 11,504,773 B2
(45) Date of Patent: Nov. 22, 2022

(54) ADAPTIVE OPTICS FOR ADDITIVE MANUFACTURING

(71) Applicant: California Institute of Technology, Pasadena, CA (US)

(72) Inventors: John B Steeves, Pasadena, CA (US); Scott N Roberts, Altadena, CA (US); Samuel C Bradford, Pasadena, CA (US); Christine A Gebara, Pasadena, CA (US); Christina J Naify, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 311 days.

(21) Appl. No.: 16/596,170

(22) Filed: Oct. 8, 2019

(65) Prior Publication Data

US 2020/0108443 A1 Apr. 9, 2020

Related U.S. Application Data

(60) Provisional application No. 62/742,679, filed on Oct. 8, 2018.

(51) Int. Cl.
| | | |
|---|---|---|
| *B22F 12/00* | (2021.01) | |
| *B23K 26/082* | (2014.01) | |
| *B23K 26/06* | (2014.01) | |
| *B22F 12/49* | (2021.01) | |
| *B22F 10/85* | (2021.01) | |
| *B22F 10/10* | (2021.01) | |
| *B22F 10/28* | (2021.01) | |
| *B22F 12/41* | (2021.01) | |
| *B23K 26/073* | (2006.01) | |

(52) U.S. Cl.
CPC ............ *B22F 12/00* (2021.01); *B22F 10/85* (2021.01); *B22F 12/49* (2021.01); *B23K 26/0643* (2013.01); *B23K 26/0648* (2013.01); *B23K 26/082* (2015.10); *B22F 10/10* (2021.01); *B22F 10/28* (2021.01); *B22F 12/41* (2021.01); *B23K 26/0665* (2013.01); *B23K 26/073* (2013.01)

(58) Field of Classification Search
None
See application file for complete search history.

(56) References Cited

U.S. PATENT DOCUMENTS

2012/0267345 A1* 10/2012 Clark ............... B23K 35/0244
219/121.35
2018/0345405 A1* 12/2018 Ostroverkhov ...... B23K 26/342

* cited by examiner

*Primary Examiner* — Colin W. Slifka
(74) *Attorney, Agent, or Firm* — KPPB LLP (57) ABSTRACT

Systems and methods for additive manufacturing systems implementing adaptive optics in accordance with various embodiments of the invention are illustrated. One embodiment includes an additive manufacturing system including a laser source configured to form an output beam, a scanning mirror disposed in an optical path of the output beam, wherein the scanning mirror is configured to reflect and scan the output beam at a range of scan angles, a deformable mirror disposed in the optical path of the output beam, wherein the deformable mirror has a plurality of configurations for reflecting and altering a wavefront of the output beam, wherein the configuration of the deformable mirror is based on the scan angle of the scanning mirror, and a print bed configured to hold a print material, wherein the output beam is configured to fuse the print material to form a build object.

10 Claims, 13 Drawing Sheets

FIG. 4A         Scan Angle: (0°, 0°)

FIG. 4B         Scan Angle: (10°, 10°)

FIG. 4C         Scan Angle: (8°, 14°)

FIG. 5A  Scan Angle: (0°, 0°)

FIG. 5B  Scan Angle: (10°, 10°)

FIG. 5C  Scan Angle: (8°, 14°)

FIG. 6

FIG. 7A  Scan Angle: (0°, 0°)

FIG. 7B  Scan Angle: (10°, 10°)

FIG. 7C  Scan Angle: (8°, 14°)

ADAPTIVE OPTICS FOR ADDITIVE MANUFACTURING

CROSS-REFERENCE TO RELATED APPLICATIONS

The current application claims the benefit of and priority under 35 U.S.C. § 119(e) to U.S. Provisional Patent Application No. 62/742,679 entitled "Adaptive Optics for Additive Manufacturing," filed Oct. 8, 2018. The disclosure of U.S. Provisional Patent Application No. 62/742,679 is hereby incorporated by reference in its entirety for all purposes.

STATEMENT REGARDING FEDERALLY SPONSORED RESEARCH OR DEVELOPMENT

This invention was made with government support under Grant No. 80NM0018D004 awarded by NASA (JPL). The government has certain rights in the invention.

FIELD OF THE INVENTION

The present invention generally relates to additive manufacturing and, more specifically, to additive manufacturing incorporating adaptive optics.

BACKGROUND

Additive manufacturing refers to processes that allow for the fabrication of objects, typically three-dimensional, using a digital file. Unlike subtractive manufacturing that starts with a solid block of material from which excess material is detracted to create a finished part, additive manufacturing typically utilizes a direct deposition method to build up a part layer by layer in accordance with a predefined design model, resulting in minimal or no waste material. Traditionally, material is directly deposited onto the part being printed and is then solidified. Depending on the material being utilized, a solidification element may be employed. This deposition and solidification process can be repeated until a desired three-dimensional part is formed—i.e., iterative layers of deposited and solidified material create additively manufactured part(s).

Additive manufacturing is typically a computer-controlled process. The process starts with a digital model data that represents the desired object to be fabricated. The digital model data can then be used to create a series of instructions through software that can be transferred into an additive manufacturing system. The additive manufacturing system can perform actions based on the instructions to produce an object in accordance with the digital model data.

SUMMARY OF THE INVENTION

Systems and methods for additive manufacturing systems implementing adaptive optics in accordance with various embodiments of the invention are illustrated. One embodiment includes an additive manufacturing system including a laser source configured to form an output beam, a scanning mirror disposed in an optical path of the output beam, wherein the scanning mirror is configured to reflect and scan the output beam at a range of scan angles, a deformable mirror disposed in the optical path of the output beam, wherein the deformable mirror has a plurality of configurations for reflecting and altering a wavefront of the output beam, wherein the configuration of the deformable mirror is based on the scan angle of the scanning mirror, and a print bed configured to hold a print material, wherein the output beam is configured to fuse the print material to form a build object.

In another embodiment, the deformable mirror is configured to alter the wavefront of the output beam by imposing spatially-varying phase variations.

In a further embodiment, the additive manufacturing system further includes an f-theta lens disposed in the optical path of the output beam, wherein the f-theta lens is configured to focus the output beam onto the print bed.

In still another embodiment, the scanning mirror is disposed in the optical path between the f-theta lens and the deformable mirror.

In a still further embodiment, the imposed spatially-varying phase variations compensate for optical distortions associated with the f-theta lens.

In yet another embodiment, the output beam is focused onto the print bed with beam diameters of less than 60 μm over a 300 mm×300 mm area of the print bed.

In a yet further embodiment, the deformable mirror is disposed in the optical path between the laser source and the scanning mirror.

In another additional embodiment, the additive manufacturing system further includes a controller for receiving a scan angle signal from the scanning mirror and for sending a configuration signal to the deformable mirror, wherein the configuration signal is associated with the scan angle, and wherein the configuration signal determines the configuration of the deformable mirror.

In a further additional embodiment, the print material is metallic powder.

In another embodiment again, the additive manufacturing system further includes a set of translatable objective lenses for modulating the beam size of the output beam.

A further embodiment again includes a method of additive manufacturing, the method including providing a print material, forming an output beam using a laser source, altering a wavefront of the output beam using a deformable mirror scanning the output beam using a scanning mirror configured to scan at a range of scan angles, and forming a build object using the output beam with the altered wavefront.

In still yet another embodiment, the wavefront of the output beam is altered by imposing spatially-varying phase variations.

In a still yet further embodiment, the method further includes focusing the output beam using an f-theta lens.

In still another additional embodiment, the output beam is focused by the f-theta lens after the wavefront of the output beam is altered.

In a still further additional embodiment, the imposed spatially-varying phase variations compensate for optical distortions associated with the f-theta lens.

In still another embodiment again, the output beam is focused onto the print bed with beam diameters of less than 60 μm over a 300 mm×300 mm area of the print bed.

In a still further embodiment again, the output beam is scanned after the wavefront of the output beam is altered.

In yet another additional embodiment, the wavefront of the output beam is altered by configuring the deformable mirror using a signal from a controller, wherein the controller is configured to receive a scan angle signal from the scanning mirror.

In a yet further additional embodiment, the build object is formed by focusing the output beam onto a metallic powder.

In yet another embodiment again, the method further includes modulating the beam size of the output beam using a set of translatable objective lenses.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as exemplary embodiments of the invention and should not be construed as a complete recitation of the scope of the invention.

DETAILED DESCRIPTION

Additive manufacturing (AM) refers to a class of techniques for fabricating objects using various deposition systems. AM techniques can include but are not limited to material extrusion, directed energy deposition, material jetting, vat polymerization, and powder bed fusion. In many cases, AM techniques employ the use of computer-aided-design (CAD) software to provide directions for forming the desired object. In some systems, the CAD software is used to provide directions to hardware to deposit material. The deposition process can include iteratively depositing material in layers of specific patterns to build the object. Various substances and materials, including glass, plastics, combination of plastics (such as thermoplastics), metals, epoxies, ceramics, polymers (such as photopolymers), powders (such as powdered metal, plastic, or ceramic), and resins (such as thermoset resins), can be utilized. Depending on the specific system utilized, a curing mechanism may be involved.

As described above, AM is a general term used to describe a wide variety of manufacturing processes. One such process enumerated above is a broad category referred to as powder bed fusion, which is an umbrella term that can include but is not limited to direct metal laser sintering (DMLS), direct metal laser melting (DMLM), selective laser sintering (SLS), selective laser melting (SLM), selective heat sintering (SHS), and electron beam melting (EBM). These different techniques can require different considerations and can have different drawbacks. For example, many techniques rely upon rastering a laser over a bed of metallic powder to melt the desired locations to build the object. This process can be repeated iteratively by layer until the full part is completed. Traditional AM systems usually rely on the optical design of the objective lens to ensure that the laser maintains focus across the print bed. Conventional methods achieve this focus by implementing an f-theta lens that attempts to produce diffraction-limited spot-sizes with minimal field curvature. However, even the most sophisticated lens designs are susceptible to optical errors, especially at large scan angles. Therefore, the focused spot size of the laser changes as the beam is scanned from the on-axis to off-axis locations.

Another drawback of these AM processes is that build volume can be quite limiting. Currently, the largest single-laser systems have build areas of approximately 10"×10" (such as the EOS M290). However, the optical distortions associated with the f-theta objective lens typically used in these systems can result in eccentricity of the focused laser beam near the edges of the build plate. Whenever the character of the beam is altered, the melting, re-solidification, and mechanical properties of the resultant part can change. As such, users typically restrict the last inch or two of the build platform to non-essential parts, or just leave it empty. Consequently, instead of a 10"×10" square to build on, only an 8" circle can be fully utilized, leaving half of the build tray's area empty. Current state of the art attempts to overcome the size limitation issue described above by utilizing multiple lasers on a single bed. Although such techniques can enable larger build sizes (e.g., the EOS M400 has a ~16"×16" build area), they introduce a new set of problems, such as but not limited to maintaining consistent power levels and optical alignment from laser to laser.

Figure 1:
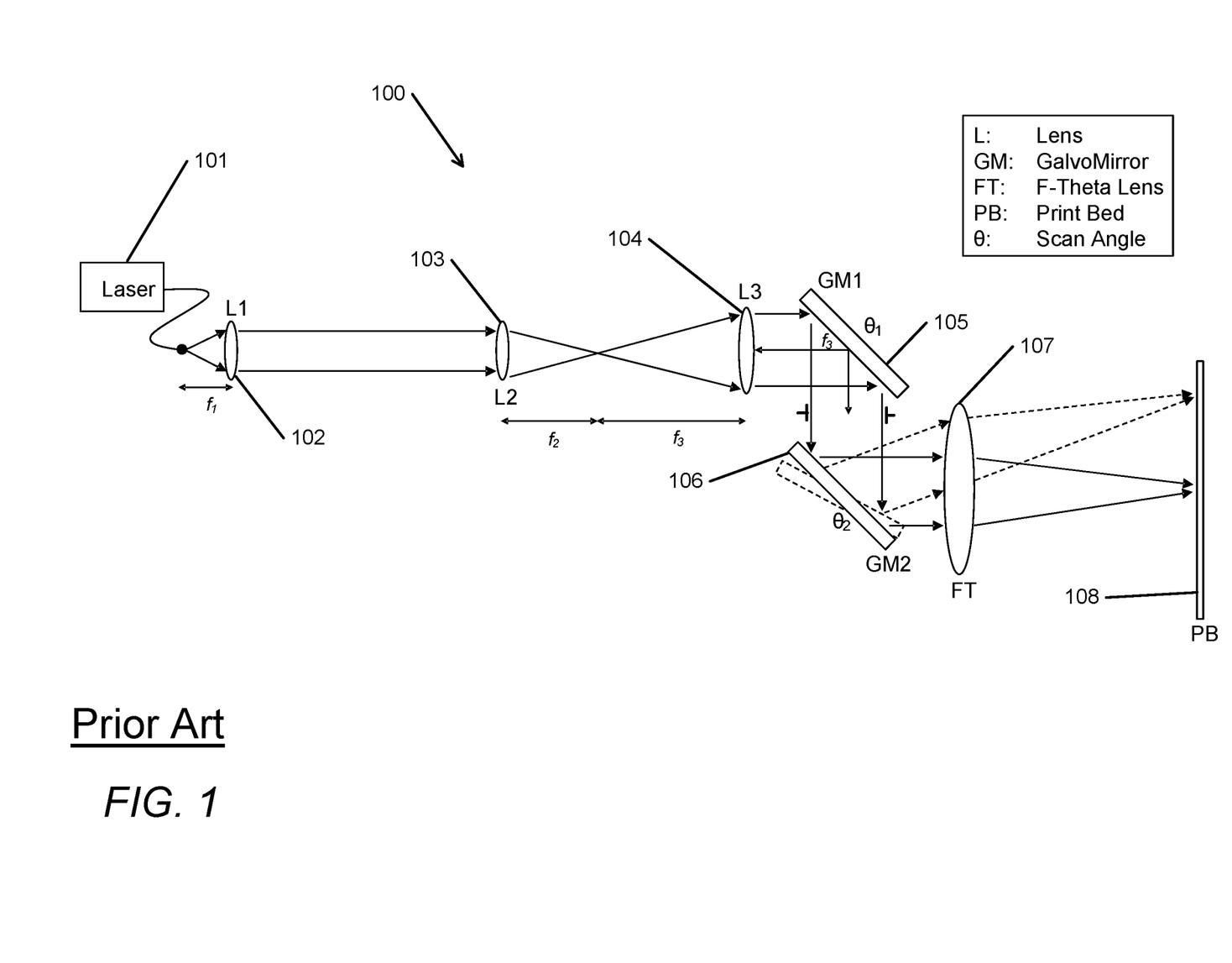
FIG. 1 illustrates a traditional powder bed fusion system.

FIG. 1 illustrates a traditional powder bed fusion system. As shown, the system 100 includes the use of a laser 101 for providing an energy source for forming the build object. Various laser sources, such as but not limited to an ytterbium (Yb) fiber laser source (1060-1100 nm, 200 W-400 W), can be utilized. The system 100 further includes a first lens 102 for collimating the output of the laser 101. The collimated beam then travels through a set of objective lenses 103, 104 that can resize the beam diameter. Translation of one or both the lenses 103, 104 can defocus the beam to modulate the focused beam size and focal length, f. The system 100 includes two mirrors 105, 106 that can be used to provide a scanning capability to the printing. Scanning mirrors such as but not limited to galvanometer mirrors can be utilized. Finally, an f-theta lens 107 is used to focus the beam to produce a flat image plane over the print bed 108. Other scan lens such as but not limited to spherical lenses and flat field scanning lenses can also be used. Depending on the specific type of scan lens, different techniques may be required to produce a flat image plane. Additionally, different scan lens can produce different optical errors. As noted above, even the most sophisticated lens designs are susceptible to optical errors.

In view of the problems afflicting traditional AM systems, AM techniques in accordance with various embodiments of the invention are directed towards solutions related to the compensation of unwanted optical errors associated with the sintering laser in powder bed additive manufacturing systems. In many embodiments, the AM system employs adaptive optics techniques to achieve the desired compensation. Adaptive optics techniques can be implemented to reduce the effect of incoming wavefront distortions through the use of a device that can compensate for such distortions and optical aberrations. Devices that can correct theses errors can include but are not limited to deformable mirrors (DMs) and liquid crystal mediums and arrays.

Utilizing the techniques described above, AM systems in accordance with various embodiments of the invention can compensate for variations in focused spot size and/or shape of the laser beam over the print areas described above. Furthermore, larger print areas can also be achieved. In some embodiments, a 1.5×-2.2× increase in print area compared to current systems (such as but not limited to the EOS M290) can be achieved. In several embodiments, adaptive optics can be employed to actively modulate the spot size and/or shape of the focused beam. Such configurations can be utilized to vary the print resolution and/or material properties of the sintered part, allowing for spatially varying properties across the build object. As can readily be appreciated, the use of adaptive optics in AM systems can allow for different configurations for various purposes. For example, in addition to compensation of optical errors described above, adaptive optics can allow for the correction of long-term optical errors in the system due to various issues, such as but not limited to thermal variations, mechanical misalignments, etc. Additive manufacturing systems utilizing adaptive optics, optical modeling, and simulation data are described below in further detail.

Additive Manufacturing Systems Utilizing Adaptive Optics

In many embodiments, an AM system incorporates an adaptive optics system that includes at least one deformable mirror. A deformable mirror is a mirror with a surface that can be deformed, allowing for wavefront control and correction of optical distortions and aberrations. In some cases, the deformable mirror is used in combination with one or more wavefront sensors for real-time adaptive optics control. Although many embodiments include the use of a deformable mirror, various adaptive optics techniques can be implemented depending on the specific requirements of the given application. In many embodiments, the deformable mirror is incorporated into the optical path of the laser. For example, the deformable mirror can be incorporated at a conjugate pupil plane upstream of the existing optical elements. As noted above, typical AM systems implement a variety of lens designs and optical elements, such as an f-theta lens, for focusing the laser. These optical elements can be susceptible to errors, especially at large scan angles. In several embodiments, the deformable mirror can impose spatially-varying phase variations into the laser beam to counteract the inherent optical errors of the f-theta lens. Utilizing such variation to correct for the optical errors can allow for the size/shape of the focused beam to be held constant across the entire area of the print bed. The variations applied can be determined in a variety of different ways. In some embodiments, at least one wavefront sensor is implemented to determine the optical errors, and the appropriate information on the variations to apply to correct such errors is sent to the deformable mirror accordingly. In several embodiments, a lookup table control solution can be implemented to determine the necessary phase variation required of the deformable mirror depending on the current scan angle.

Deformable mirrors in accordance with various embodiments of the invention can be implemented and controlled in a variety of different ways. The shape of a deformable mirror can be controlled with a speed that is appropriate for compensation of dynamic aberrations present in the optical system. In many embodiments, the shape of the deformable mirror is altered faster than the process to be corrected as the correction process, even for a static aberration, may take several iterations. Deformable mirrors usually have many degrees of freedom. Typically, these degrees of freedom are associated with the mechanical actuators. In some systems, one actuator corresponds, or roughly corresponds, to one degree of freedom.

Figure 2:
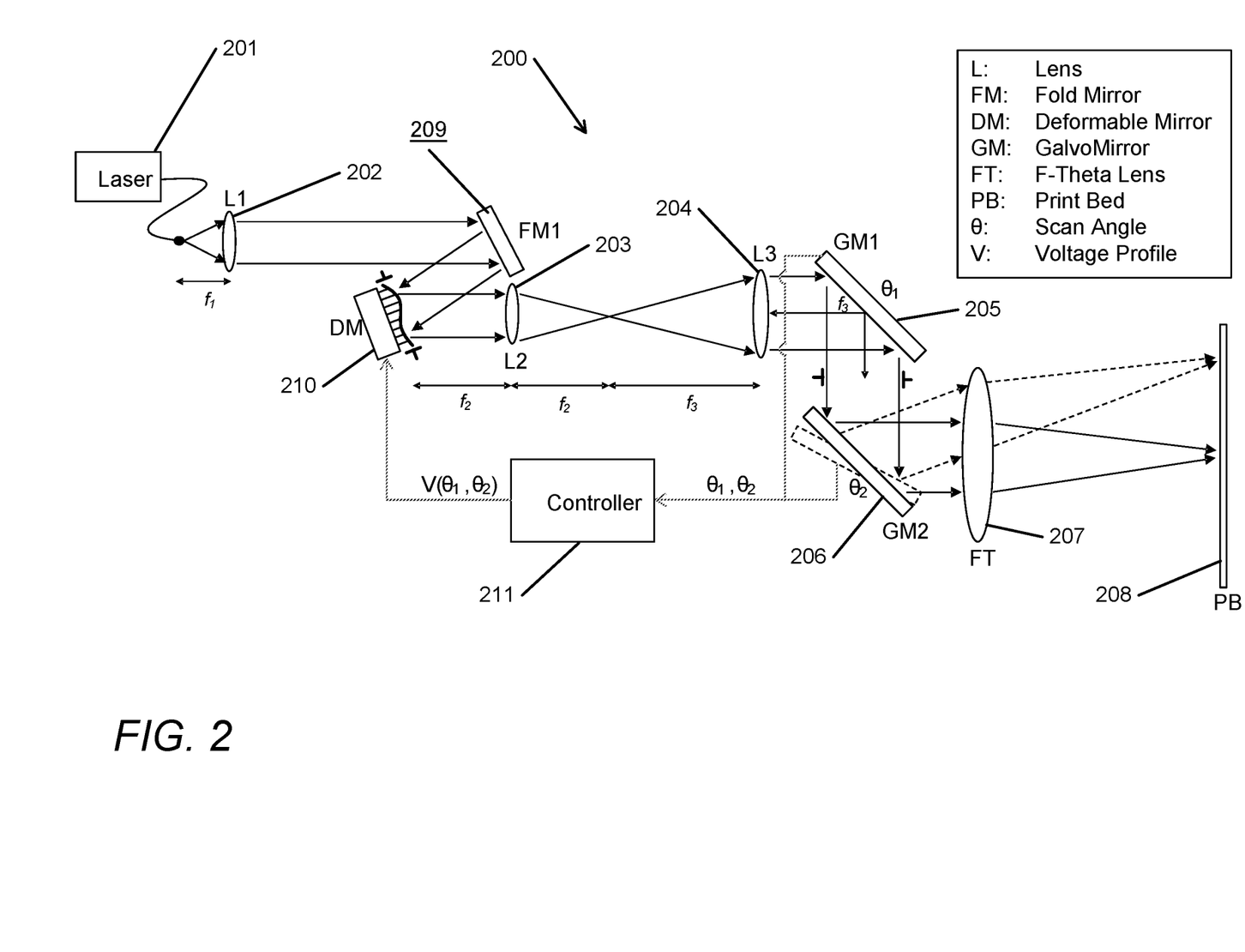
FIG. 2 conceptually illustrates an additive manufacturing system utilizing adaptive optics in accordance with an embodiment of the invention.

FIG. 2 conceptually illustrates an additive manufacturing system utilizing adaptive optics in accordance with an embodiment of the invention. As shown, the system 200 includes many similar elements (such as a laser 201, collimating lens 202, diameter-resizing lens 203, 204, scanning mirrors 205, 206, an f-theta lens 207, and a print bed 208) to that of a conventional additive manufacturing system (such as the one shown in FIG. 1). Additionally, however, the system 200 also includes a fold mirror 209 for redirecting the collimated beam to a deformable mirror 210. The beam can then be altered by the deformable mirror 210 and redirected towards diameter-resizing lens 203. Operation then occurs similar to that of a conventional additive manufacturing system. The system 200 includes the deformable mirror 210 as an implementation of an adaptive optics system. The deformable mirror can be placed in the optical path in a variety of configurations depending on the application. In some embodiments, the deformable mirror is placed upstream of existing optical elements, located at conjugate pupil plane. Depending on the optical errors, the deformable mirror 210 can be adjusted accordingly. In the illustrative embodiment, the deformable mirror 210 is configured to induce spatially-varying phase delays in the laser beam to account for field-dependent errors in the f-theta lens 207. In some embodiments, a lookup table control solution is implemented to determine the necessary phase variation to apply to correct the optical errors, which can be indexed by the scanning mirrors' scan angles. In such embodiments, the system 200 can include a controller 211 capable of taking the scan angles ($\Theta_1$, $\Theta_2$) as inputs and converting them to a voltage profile V that controls the configuration of the deformable mirror 210. In a number of embodiments, the deformable mirror is altered faster than the process to be corrected.

Although FIG. 2 shows a specific configuration of an additive manufacturing system implementing adaptive optics, various modifications and configurations can be utilized as appropriate depending on the specific requirements of the given application. For example, many systems employing the use of adaptive optics can include wavefront sensor(s) that can determine optical errors. Such systems can respond with adaptive optics in real time.

Optical Modeling

Figure 3A:
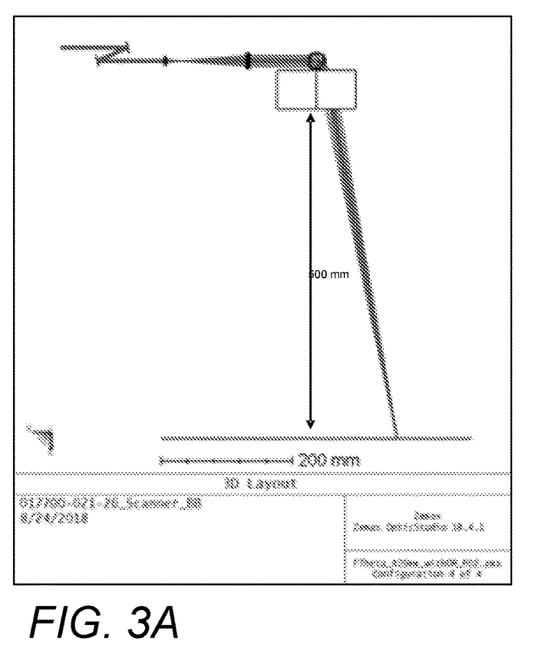
FIGS. 3A and 3B conceptually illustrate an optical model of an additive manufacturing system implementing adaptive optics in accordance with an embodiment of the invention.
Figure 3B:
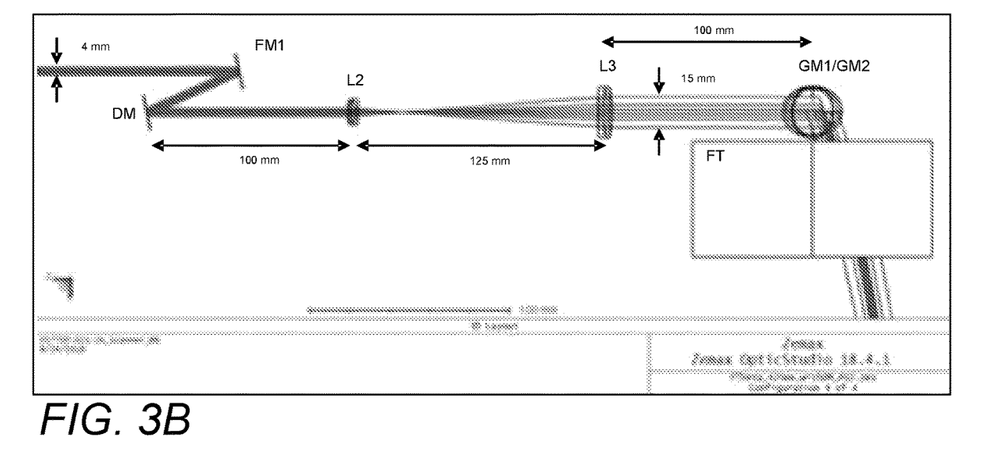

AM systems utilizing adaptive optics in accordance with various embodiments of the invention can be optically modeled to provide further insight in the effects of implementing adaptive optics. FIG. 3A conceptually illustrates an optical model of an additive manufacturing system implementing adaptive optics in accordance with an embodiment of the invention. FIG. 3B shows a closer, more detailed view of the optical model. In the illustrative embodiment, Zemax OpticStudio 18.4.1 was used to evaluate the optical performance of the AM system. JENOPTIK JENar™ 420-1030 F-Theta lens was used for the analysis. Three analyses can be performed to assess uncorrected performance of the system: focused beam profile vs. scan angle, encircled energy vs. scan angle, and wavefront error vs. scan angle.

Figure 4A:
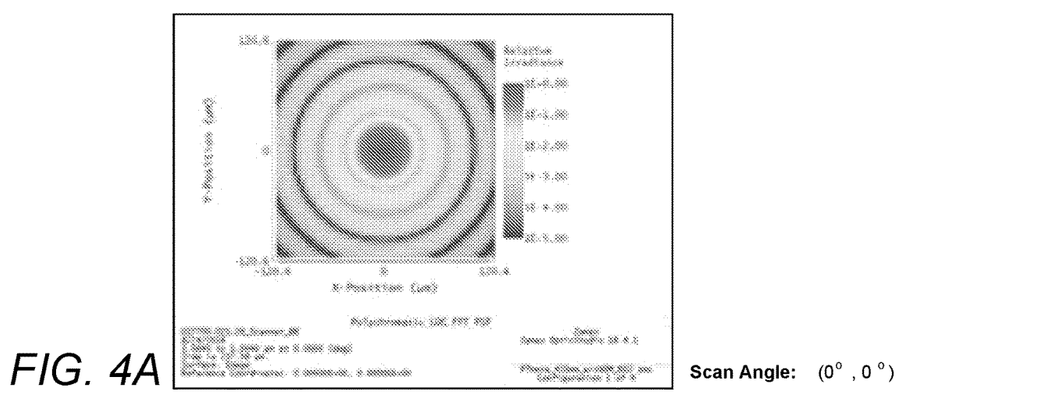
FIGS. 4A-4C show focused beam profiles at different scan angles of an additive manufacturing system.
Figure 4B:
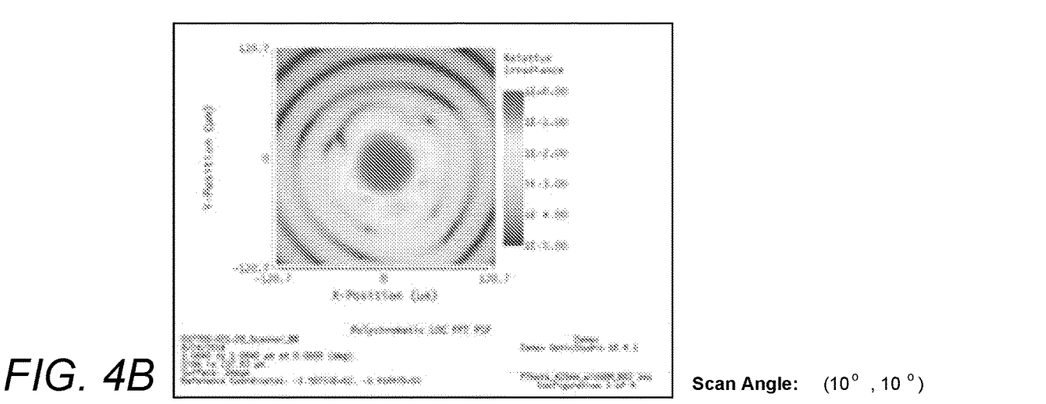
Figure 4C:
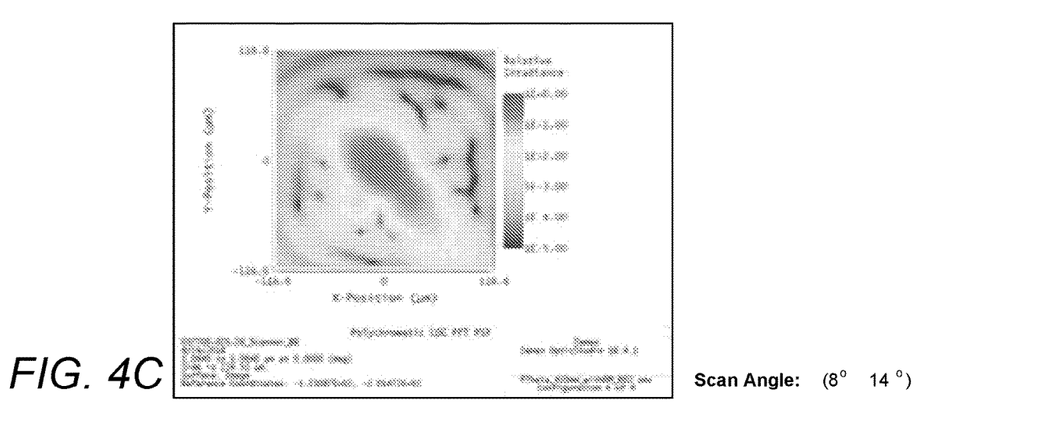

FIGS. 4A-4C show the focused beam profiles at different scan angles. As shown in FIG. 4A, a uniform, circular beam is produces at on-axis field locations (0°,0°). FIG. 4B shows that deviations from the circular profile starts to occur at high scan angles (10°,10°). FIG. 4C shows significant beam distortion at angles outside the manufacturer's specified range (8°,14°). At further scan angles, "beam clipping" can occur.

Figure 5A:
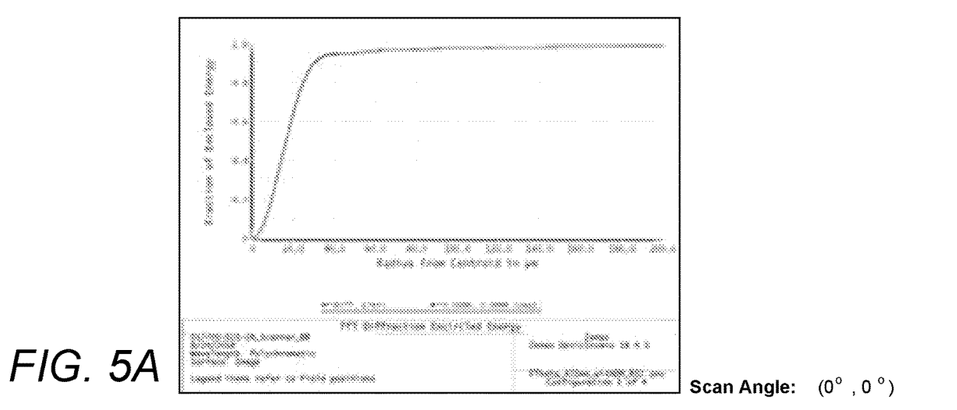
FIGS. 5A-5C show the encircled energy at different scan angles of an additive manufacturing system.
Figure 5B:
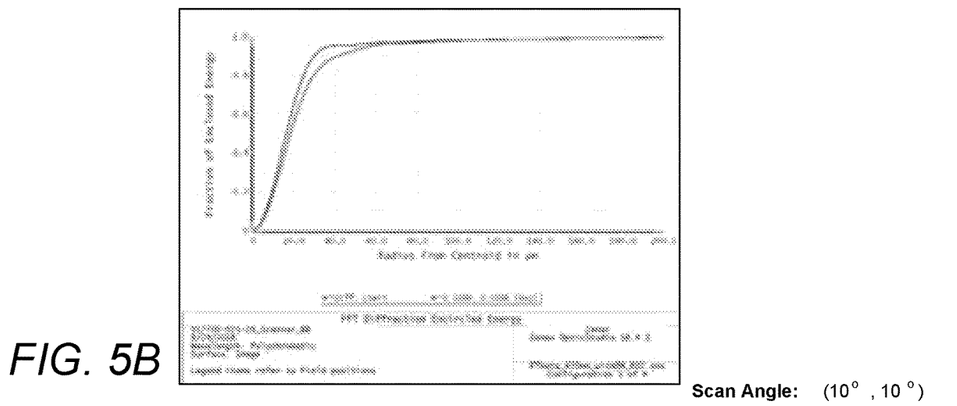
Figure 5C:
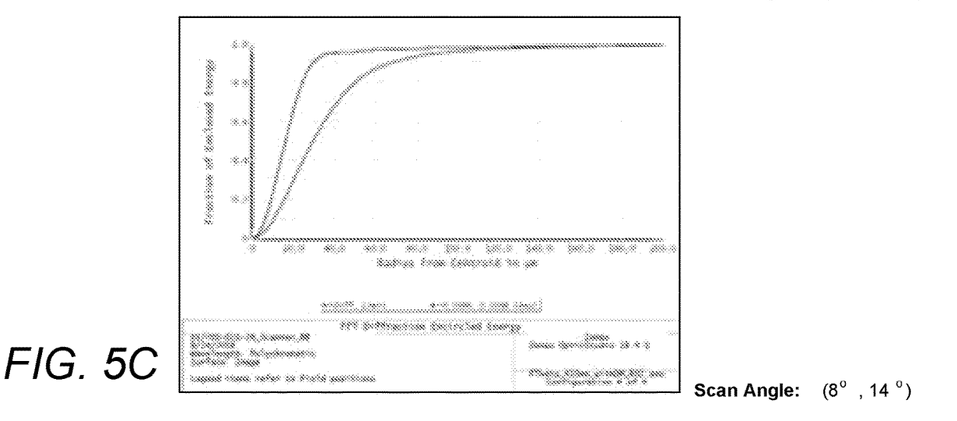
Figure 6:
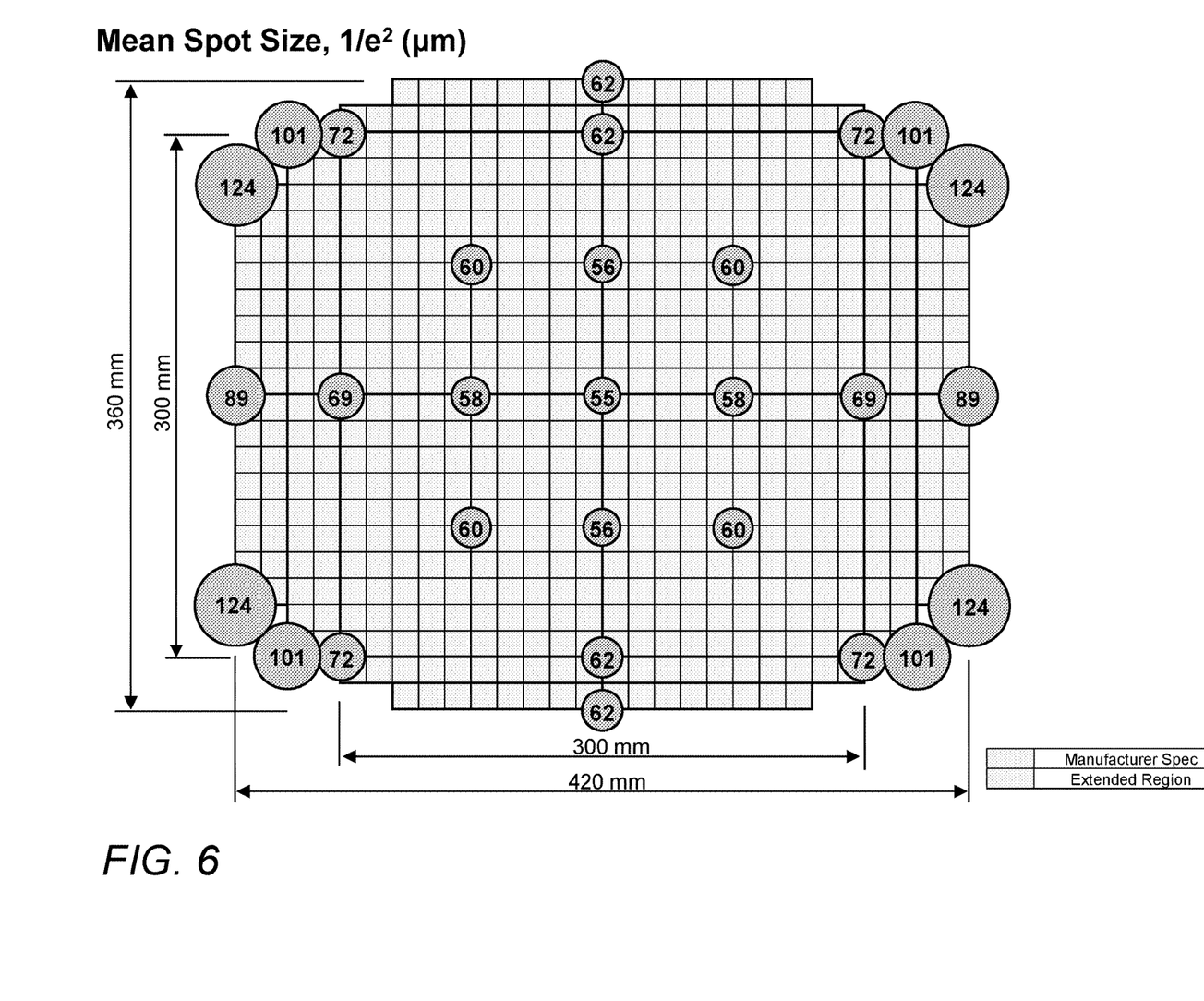
FIG. 6 shows the mean spot size (μm) across several field locations of an additive manufacturing system.

FIGS. 5A-5C show the encircled energy at different scan angles. The encircled energy measures the fraction of total energy over a given circular area, which can be used to define average beam diameter. As shown, diffraction-limited performance for on-axis location results in a 55 µm beam diameter. Deviation from diffraction limited state occurs at high scan angles (72 µm beam diameter for (10°, 10°) scan angle and 124 µm beam diameter for (8°, 14°) scan angle). FIG. 6 shows the mean spot size (µm) across several field locations, including the manufacturer's specified range and extended regions. "Extended region" is defined as the region of achievable scan locations before the beam is clipped/shadowed by f-theta lens (54% increase in area over manufacturer specifications). As shown, there is significant variation in average beam size across the field (not accounting for change in beam profile), which has significant implications for print resolution and uniformity.

Figure 7A:
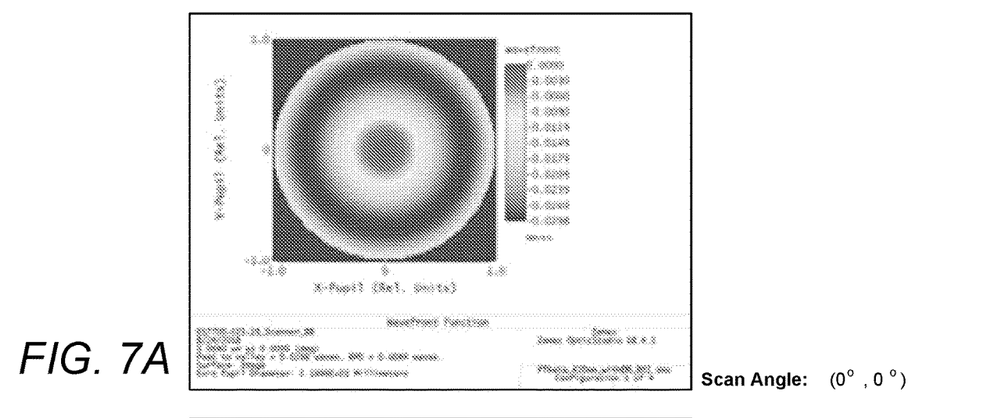
FIGS. 7A-7C show wavefront errors with respect to different scan angles of an additive manufacturing system.
Figure 7B:
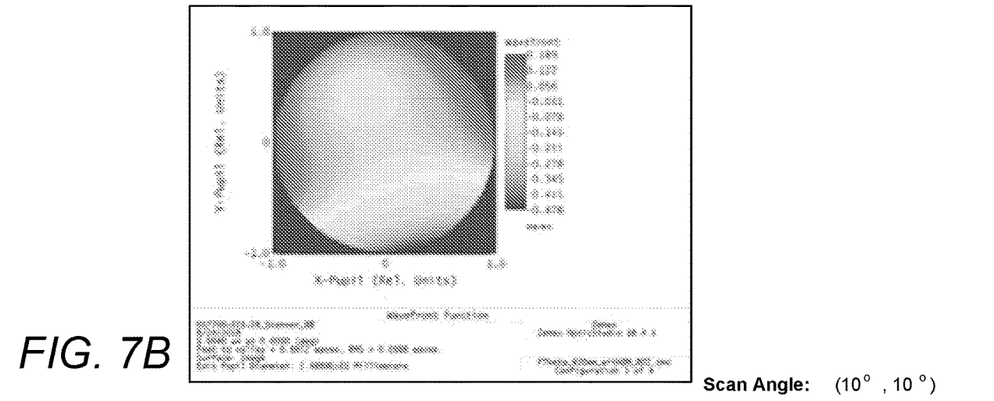
Figure 7C:
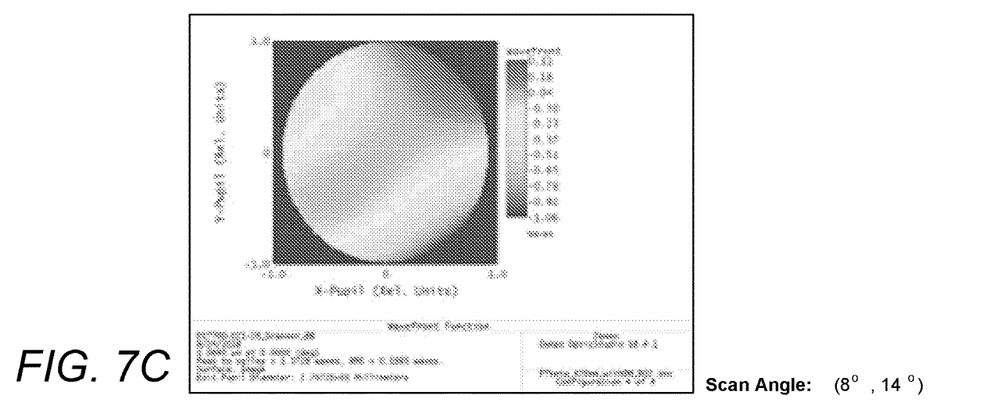
Figure 8A:
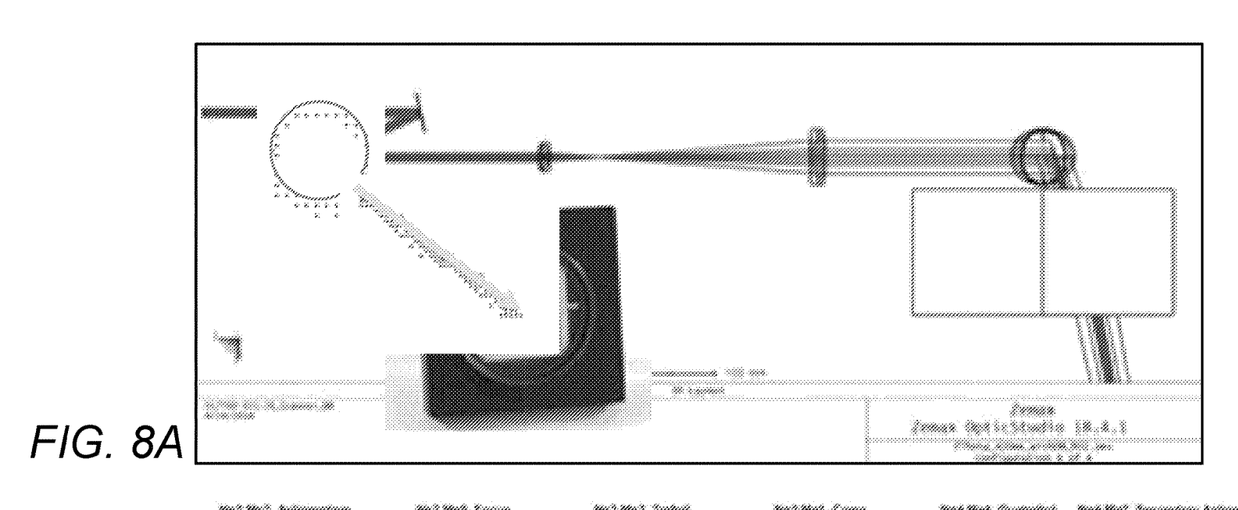
FIG. 8A shows the use of a deformable mirror to compensate for the wavefront errors by inducing spatially-varying phase delay in the beam prior to the beam entering the f-theta lens of an additive manufacturing system in accordance with an embodiment of the invention.
Figure 8B:
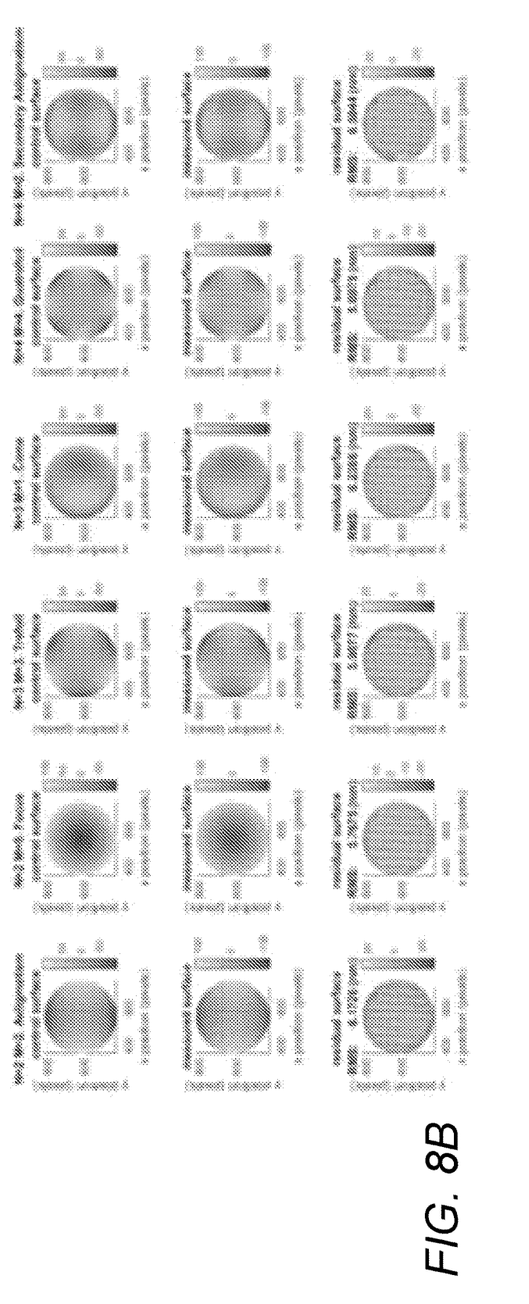
FIG. 8B shows the characterization of a deformable mirror in accordance with an embodiment of the invention.
Figure 9A:
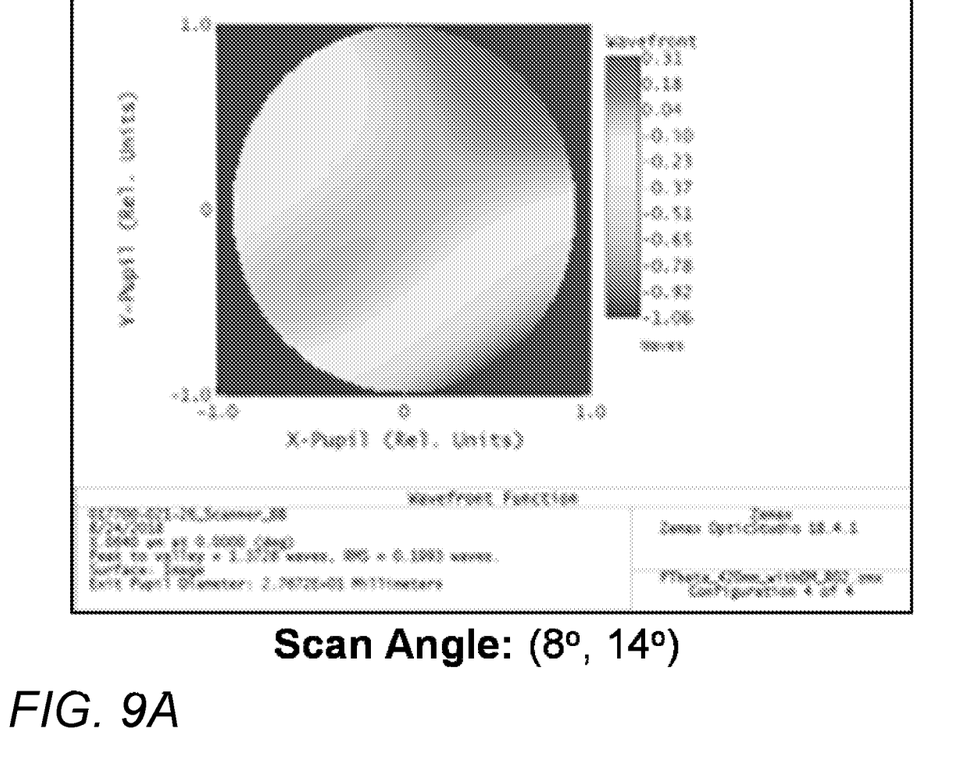
FIGS. 9A-9B show a Zernike decomposition in accordance with an embodiment of the invention.
Figure 9B:
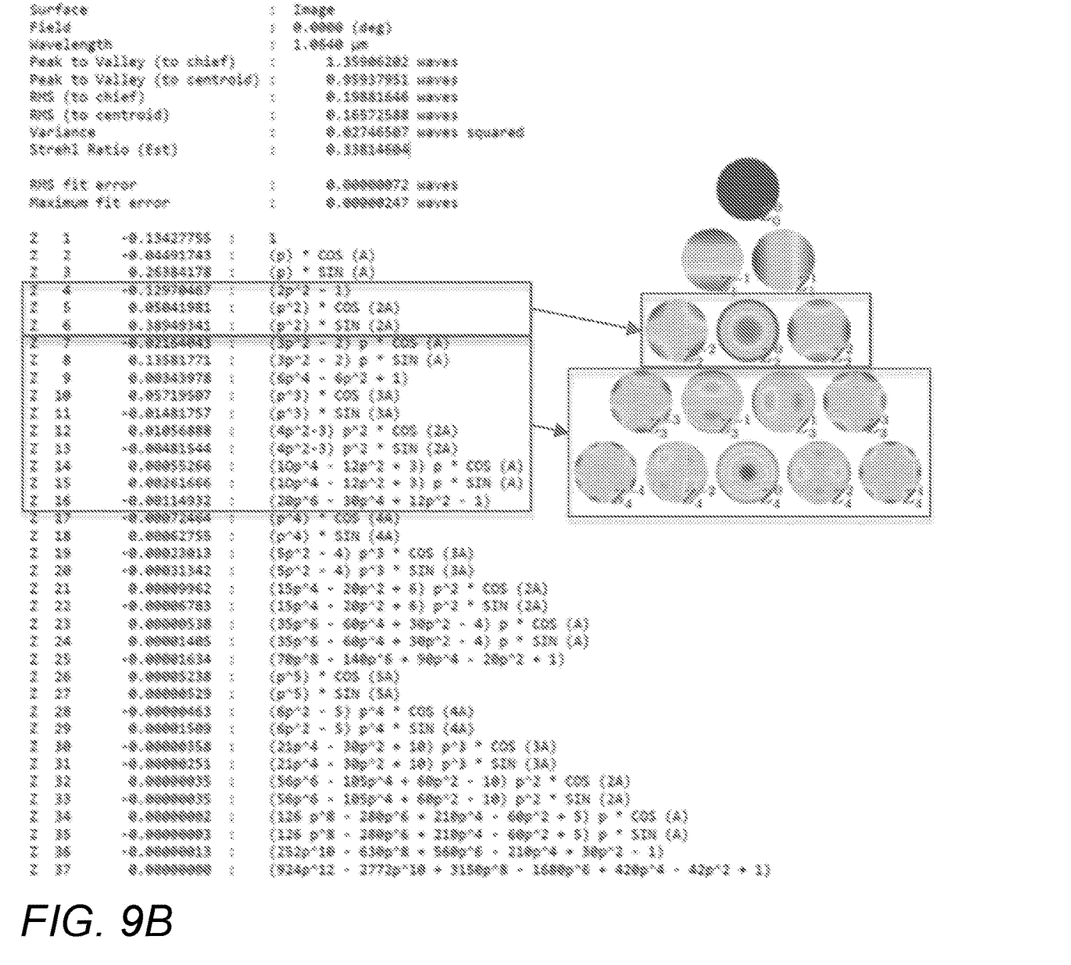

FIGS. 7A-7C show wavefront errors with respect to different scan angles. Wavefront errors can be defined as the spatially-varying phase delays at a pupil plane and can be referred to as optical errors in the system that result in image degradation (i.e., distortion of the focused beam). As described above, these errors can be corrected for by inducing the same phase delay, but of opposite sign at a conjugate pupil plane upstream of the f-theta lens. FIG. 8A shows the use of a deformable mirror to compensate for the wavefront errors by inducing spatially-varying phase delay in the beam prior to the beam entering the f-theta lens. FIG. 8B shows the characterization of a deformable mirror in accordance with an embodiment of the invention. In the illustrative embodiment, a deformable mirror MEMs device from Boston Micro Machine is examined using optical interferometer. The DM has a 12×12-actuator array with a 3.5 µm stroke per actuator. FIGS. 9A-9B show a Zernike decomposition in accordance with an embodiment of the invention. A wavefront error can be represented by a set of discrete orthogonal shape functions (Zernike polynomials), with a majority of wavefront errors contained within the first 16 Zernike polynomials. As shown in FIGS. 8A and 8B, the DM can produce low-order Zernike polynomials (i.e., Z4-Z16). In some embodiments, this provides a standard of requirements for the deformable mirror.

Figure 10:
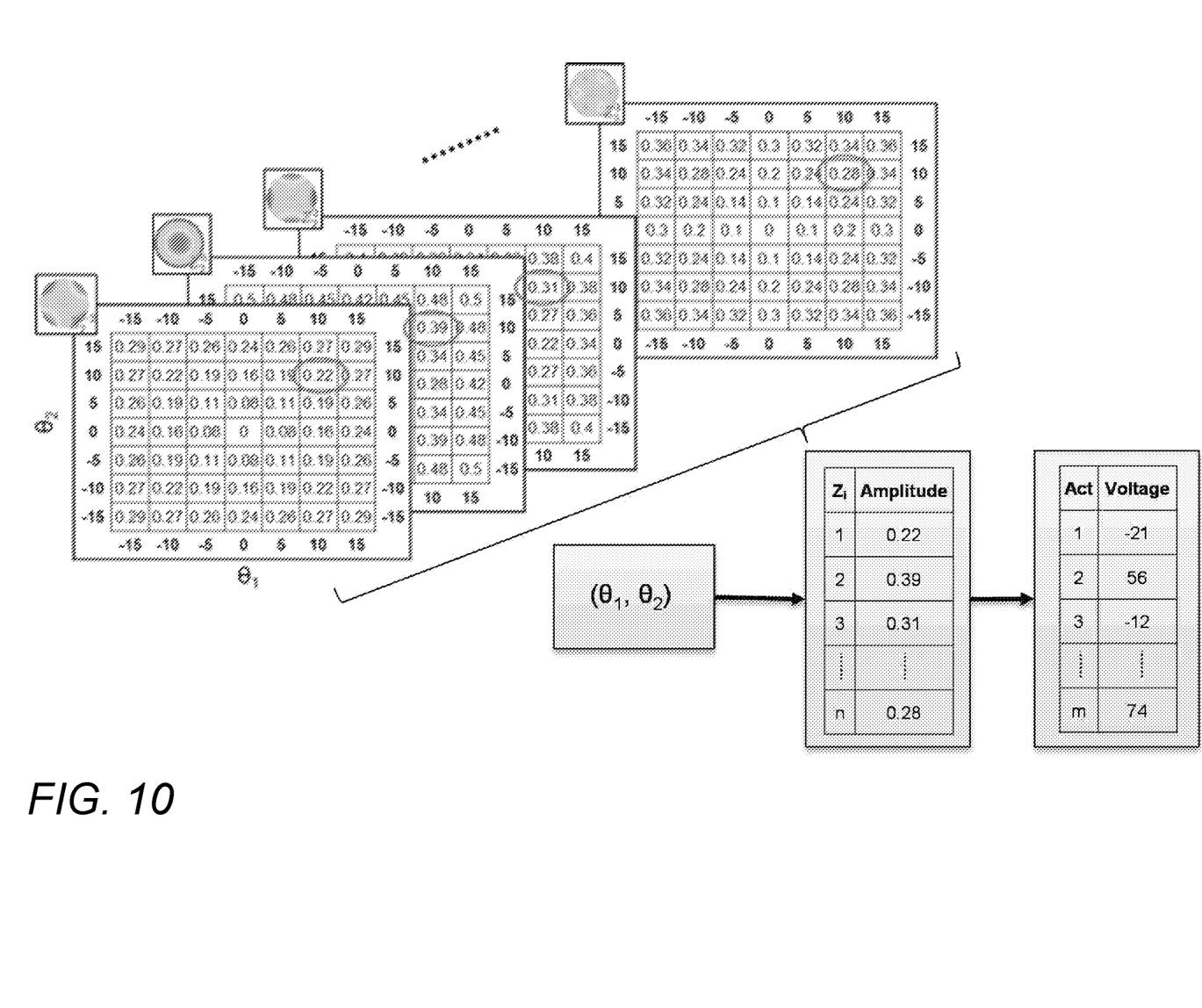
FIG. 10 conceptually illustrates a method of implementing a look-up table control scheme for a deformable mirror implementation in accordance with an embodiment of the invention.

As discussed above, many different methods can be utilized for controlling the adaptive optics implementation. For example, many embodiments include the use of a look-up table control scheme to determine the configuration of the adaptive optics, such as but not limited to a deformable mirror. FIG. 10 conceptually illustrates a method of implementing a look-up table control scheme for a deformable mirror implementation in accordance with an embodiment of the invention. As shown, the look-up table provides a voltage map associated with inputs of the scan angles ($\Theta_1$, $\Theta_2$) of the scanning optics. The amplitude of each Zernike mode can be determined by the present scan angle ($\Theta_1$, $\Theta_2$). The Zernike modes determine the voltage map for the deformable mirror; voltages required to produce each Zernike mode can be determined a priori.

Figure 11A:
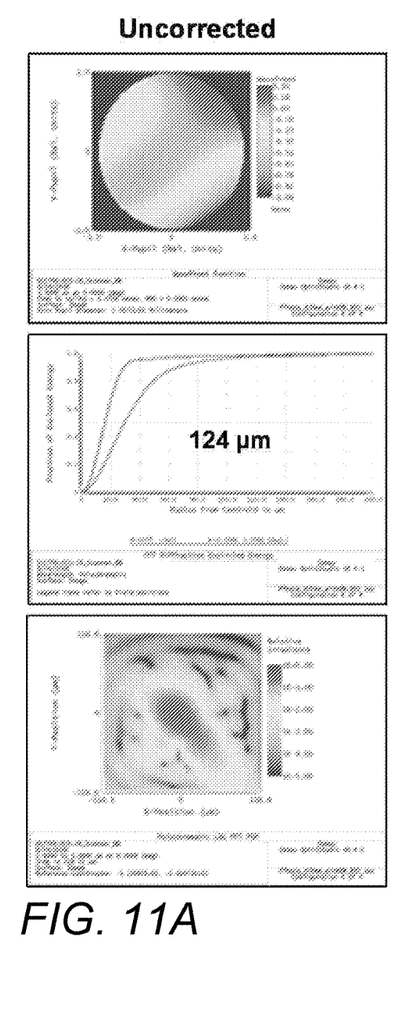
FIGS. 11A-11C conceptually illustrate a comparison of an uncorrected beam profile to two different levels of correction in accordance with various embodiments of the invention.
Figure 11B:
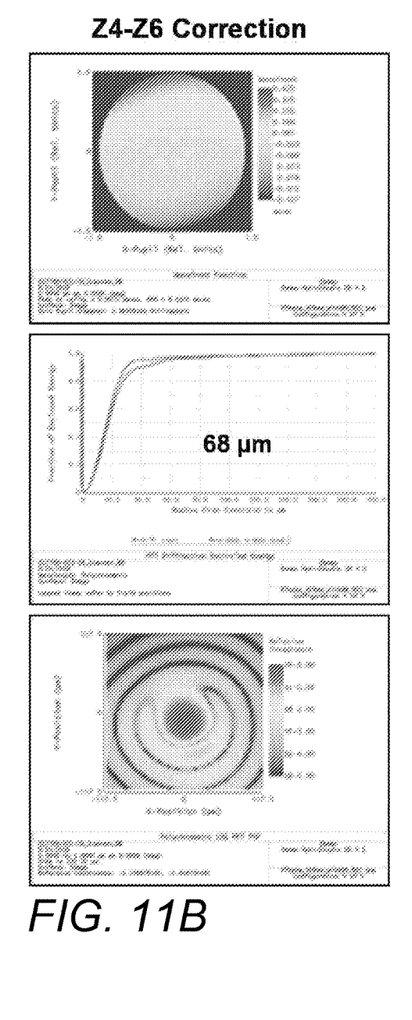
Figure 11C:
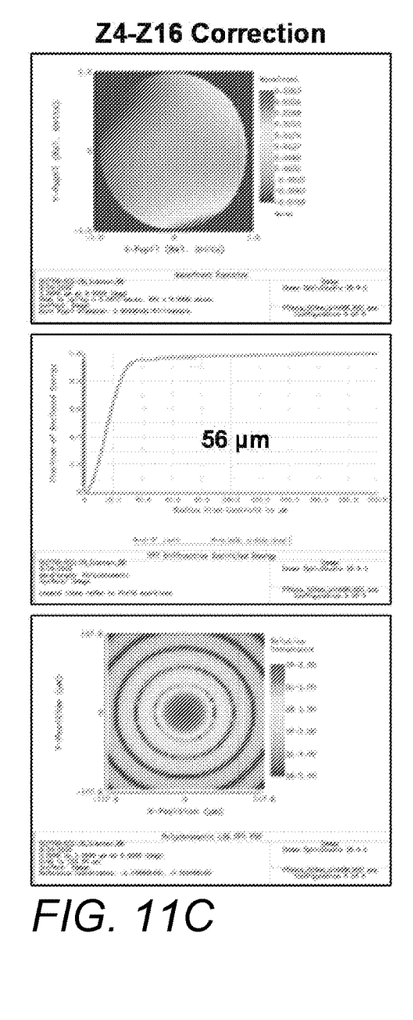
Figure 12:
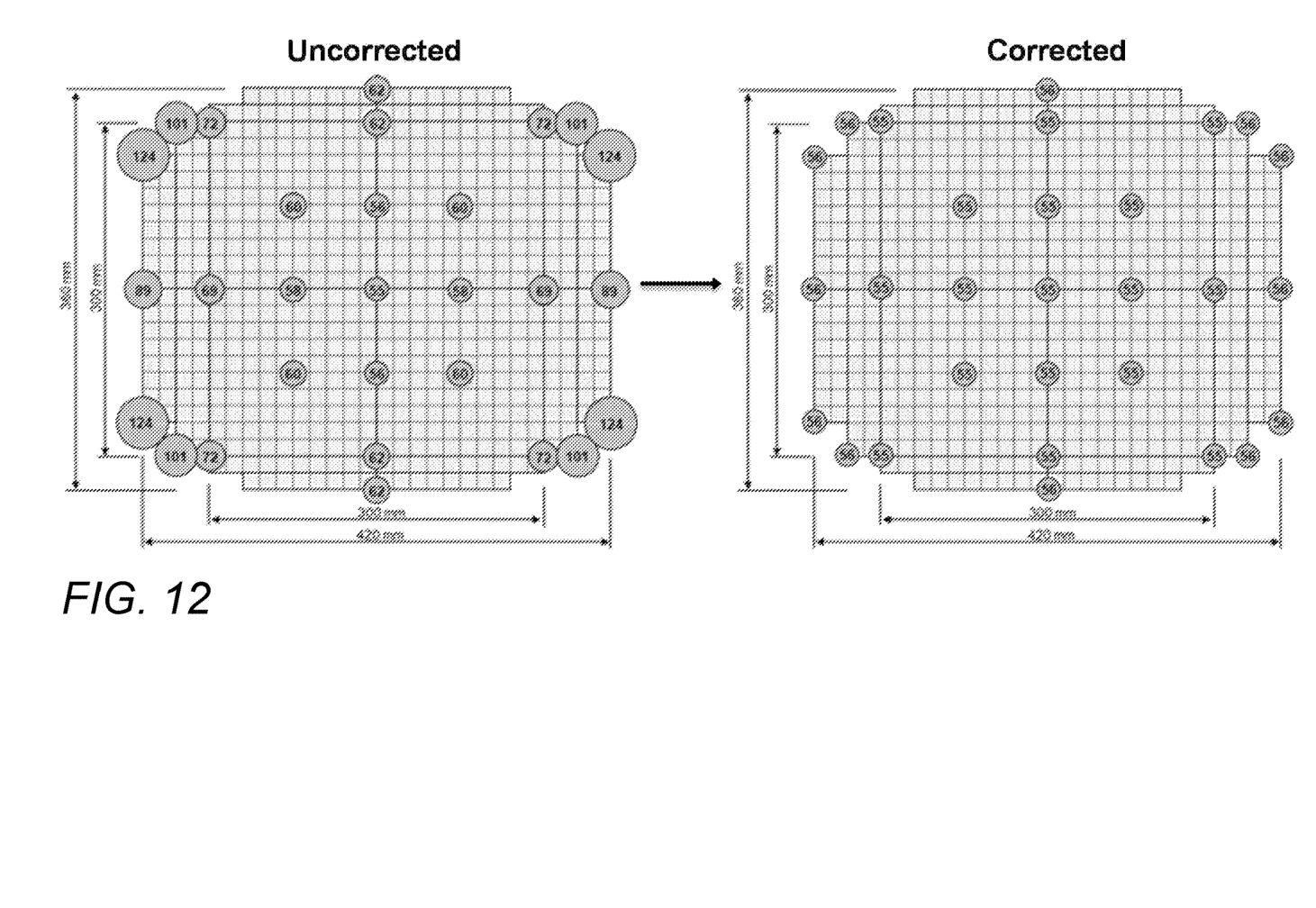
FIG. 12 conceptually illustrates the uncorrected and corrected mean spot size (μm) across several field locations of an AM system utilizing adaptive optics in accordance with an embodiment of the invention.

FIGS. 11A-11C conceptually illustrate a comparison of an uncorrected beam profile to two different levels of correction in accordance with various embodiments of the invention. FIG. 11A shows an uncorrected beam profile while FIGS. 11B and 11C show the profiles of a simplified correction and a standard correction, respectively. As shown, the range of correction is well within the stroke limitations of the deformable mirror. FIG. 11B shows that the simplified correction returns the highly distorted beam to a circular profile. However, the beam is still larger than the diffraction-limited (on-axis) spot. FIG. 11C shows that the standard correction returns the beam to a circular, diffraction limited spot. FIG. 12 conceptually illustrates the uncorrected and corrected mean spot size (µm) across several field locations of an AM system utilizing adaptive optics in accordance with an embodiment of the invention. As shown, adaptive optics can enable diffraction-limited performance to be achieved over the entire print bed. This can allow for an increase in the print area by more than ~50%.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An additive manufacturing system comprising:
   a laser source configured to form an output beam;
   a scanning mirror disposed in an optical path of the output beam, wherein the scanning mirror is configured to reflect and scan the output beam at a range of scan angles;
   a deformable mirror disposed in the optical path of the output beam at a conjugate pupil plane, wherein the deformable mirror has a plurality of configurations for reflecting and altering a wavefront of the output beam, wherein the configuration of the deformable mirror is based on the scan angle of the scanning mirror; and
   a print bed configured to hold a print material, wherein the output beam is configured to fuse the print material to form a build object.

2. The additive manufacturing system of claim 1, wherein the deformable mirror is configured to alter the wavefront of the output beam by imposing spatially-varying phase variations.

3. The additive manufacturing system of claim 2, further comprising an f-theta lens disposed in the optical path of the output beam, wherein the f-theta lens is configured to focus the output beam onto the print bed.

4. The additive manufacturing system of claim 3, wherein the scanning mirror is disposed in the optical path between the f-theta lens and the deformable mirror.

5. The additive manufacturing system of claim 3, wherein the imposed spatially-varying phase variations compensate for optical distortions associated with the f-theta lens.

6. The additive manufacturing system of claim 3, wherein the output beam is focused onto the print bed with beam diameters of less than 60 µm over a 300 mm×300 mm area of the print bed.

7. The additive manufacturing system of claim 1, wherein the deformable mirror is disposed in the optical path between the laser source and the scanning mirror.

8. The additive manufacturing system of claim 1, further comprising a controller for receiving a scan angle signal from the scanning mirror and for sending a configuration signal to the deformable mirror, wherein the configuration signal is associated with the scan angle, and wherein the configuration signal determines the configuration of the deformable mirror.

9. The additive manufacturing system of claim 1, wherein the print material is metallic powder.

10. The additive manufacturing system of claim 1, further comprising a set of translatable objective lenses for modulating a beam size of the output beam.

* * * * *